(12) United States Patent
Vielma Diaz et al.

(10) Patent No.: US 10,086,636 B1
(45) Date of Patent: Oct. 2, 2018

(54) SYNCHRONIZING HYBRID PRINT MEDIA WITH ELECTRONIC DEVICES

(71) Applicant: Amazon Technologies, Inc., Seattle, WA (US)

(72) Inventors: Christian David Vielma Diaz, San Luis Obispo, CA (US); Dirk Tomio Cummings, Grover Beach, CA (US); Timothy Albert Laferriere, Nipomo, CA (US); Troy Franklin Thacker, San Luis Obispo, CA (US); Trent Edward Thacker, San Luis Obispo, CA (US); Wayne Claus Heaney, San Luis Obispo, CA (US)

(73) Assignee: Amazon Technologies, Inc., Seattle, WA (US)

( * ) Notice: Subject to any disclaimer, the term of this patent is extended or adjusted under 35 U.S.C. 154(b) by 417 days.

(21) Appl. No.: 14/494,363

(22) Filed: Sep. 23, 2014

(51) Int. Cl.
  *B42D 1/00* (2006.01)
  *H04L 29/08* (2006.01)

(52) U.S. Cl.
  CPC .............. *B42D 1/003* (2013.01); *H04L 67/22* (2013.01)

(58) Field of Classification Search
  CPC .......... B42D 1/003; B42D 1/007; B42D 3/00; B42D 3/006; B42D 3/008; B42D 3/12; B42D 3/14; B42D 9/00; B42D 9/001; B42D 9/008; B42D 9/02; G09B 5/062
  See application file for complete search history.

(56) References Cited

U.S. PATENT DOCUMENTS

| | | | | |
|---|---|---|---|---|
| 8,874,731 | B1 * | 10/2014 | Puppin | G06F 17/30867 707/736 |
| 2001/0054645 | A1 * | 12/2001 | Rathus | B42D 3/123 235/462.15 |
| 2003/0116620 | A1 * | 6/2003 | Song | G06F 3/0224 235/375 |
| 2004/0191741 | A1 * | 9/2004 | Ferrigno | G09B 5/062 434/309 |
| 2007/0203955 | A1 * | 8/2007 | Pomerantz | G06F 17/30017 |

\* cited by examiner

*Primary Examiner* — Bruk Gebremichael
(74) *Attorney, Agent, or Firm* — Lee & Hayes, PLLC

(57) ABSTRACT

A user may often be reading the same content on multiple different electronic devices, and this user may also wish to read the same content on printed pages of a physical book. In this case, described is a hybrid print medium that includes both printed pages and a computer system allowing a user to synchronize a current reading location in the hybrid print medium with the same content being read on one or more electronic devices. In different cases, this synchronization may include a synchronization service or the synchronization may occur directly between a hybrid print medium and an electronic device storing an electronic version of the content within the hybrid print medium.

20 Claims, 12 Drawing Sheets

900 ↘

```
┌─────────────────────────────────────────────────────┐
│ INCLUDING, WITHIN A FIRST PRINTED PAGE, A FIRST     │
│ CIRCUIT INCLUDING A FIRST PAIR OF CONTACTS ON       │
│ OPPOSITE SIDES OF A FIRST RESISTOR, WHERE THE       │
│ FIRST PAIR OF CONTACTS ARE CONFIGURED TO CARRY      │
│ A FIRST CURRENT FROM A POWER SOURCE 902             │
└─────────────────────────────────────────────────────┘
                          ↓
┌─────────────────────────────────────────────────────┐
│ INCLUDING, WITHIN THE FIRST PRINTED PAGE, A FIRST   │
│ CONNECTION TO THE FIRST CIRCUIT, WHERE THE FIRST    │
│ CONNECTION IS CONFIGURED TO PROVIDE A SENSOR AN     │
│ INDICATION OF THE FIRST CURRENT 904                 │
└─────────────────────────────────────────────────────┘
                          ↓
┌─────────────────────────────────────────────────────┐
│ INCLUDING, WITHIN A SECOND PRINTED PAGE, A SECOND   │
│ CIRCUIT INCLUDING A SECOND PAIR OF CONTACTS ON      │
│ OPPOSITE SIDES OF A SECOND RESISTOR, WHERE THE      │
│ SECOND PAIR OF CONTACTS ARE CONFIGURED TO CARRY     │
│ A SECOND CURRENT 906                                │
└─────────────────────────────────────────────────────┘
                          ↓
┌─────────────────────────────────────────────────────┐
│ INCLUDING, WITHIN THE SECOND PRINTED PAGE, A SECOND │
│ CONNECTION TO THE SECOND CIRCUIT, WHERE THE SECOND  │
│ CONNECTION IS CONFIGURED TO PROVIDE THE SENSOR AN   │
│ INDICATION OF THE SECOND CURRENT 908                │
└─────────────────────────────────────────────────────┘
                          ↓
┌─────────────────────────────────────────────────────┐
│ POSITIONING, WITHIN THE FIRST PRINTED PAGE, THE     │
│ FIRST PAIR OF CONTACTS AT A LOCATION SUCH THAT THE  │
│ FIRST PAIR OF CONTACTS MAKES CONTACT WITH THE       │
│ SECOND PAIR OF CONTACTS ON THE SECOND PRINTED PAGE  │
│ WHEN THE SECOND PRINTED PAGE IS TURNED TO MEET THE  │
│ FIRST PRINTED PAGE, WHERE IN RESPONSE TO MAKING     │
│ CONTACT THE FIRST CIRCUIT EXPANDS TO INCLUDE THE    │
│ SECOND CIRCUIT 910                                  │
└─────────────────────────────────────────────────────┘
```

SYNCHRONIZING HYBRID PRINT MEDIA WITH ELECTRONIC DEVICES

BACKGROUND

Traditional print media such as books, magazines, and newspapers are often being viewed on electronic devices. In many cases, a reader may wish to read the same content printed on a physical medium on an electronic device. In some cases, the reader may have multiple electronic devices, where the same electronic content may be stored and readable on different ones of the electronic devices. In this way, the reader need not carry a single device around in order to have access to the same content. However, when the reader is reading the same content on different devices and also on a print medium, the reader is faced with the difficulty of synchronizing reading locations between the different instances of the same content.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 9 illustrates a flowchart depicting selected operations in creating a printed page within a hybrid print medium according to some implementations.

DETAILED DESCRIPTION

Figure 1:
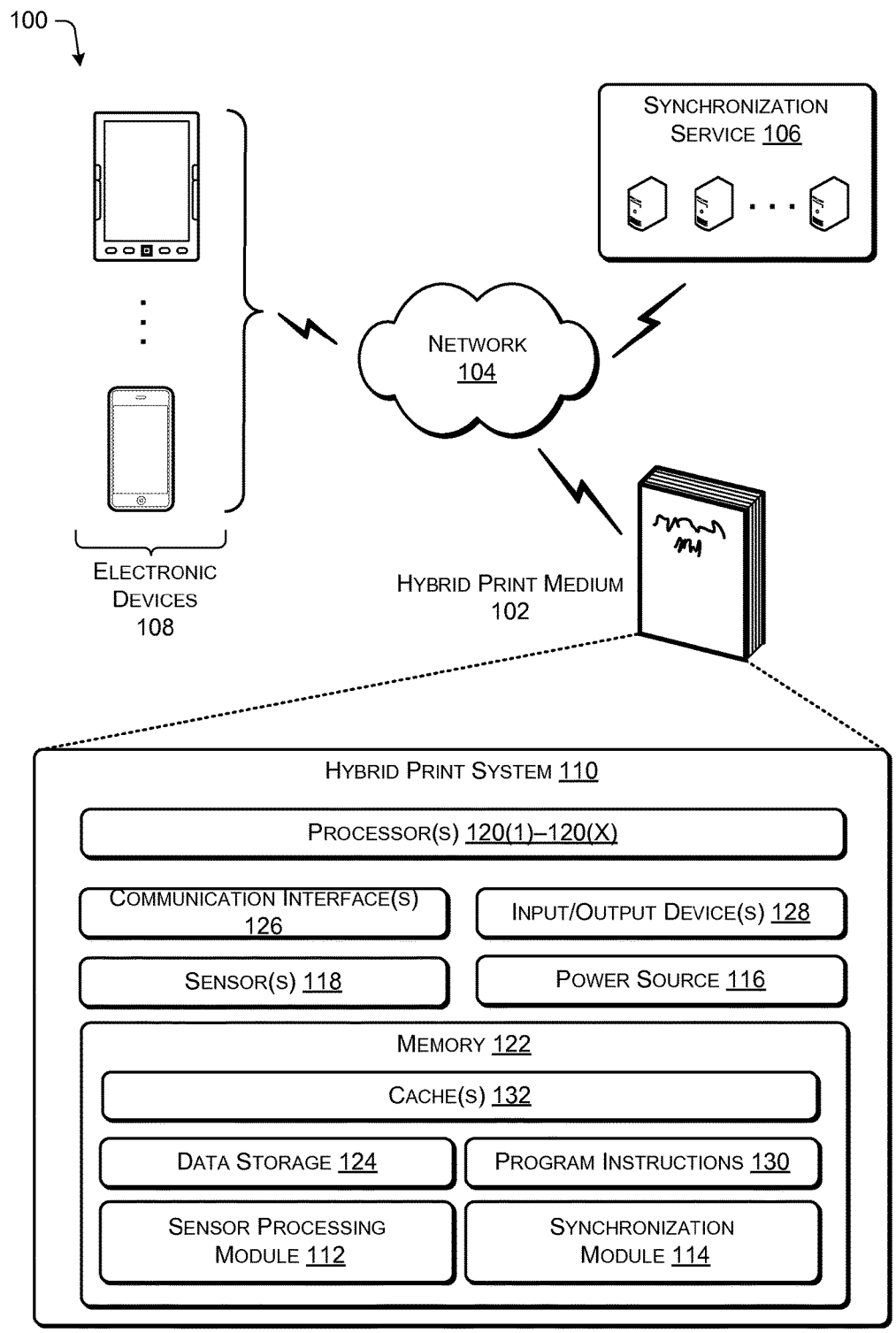
FIG. 1 is an illustrative environment depicting an example hybrid print medium within a network.

The systems and techniques described in this disclosure specify implementations for synchronizing a hybrid print medium with one or more electronic versions of content printed in the hybrid print medium, where the one or more electronic versions of the content may be stored on respective electronic devices. In some cases, a synchronization service may be involved in synchronizing content among the hybrid print medium and the electronic devices.

A hybrid print medium may include bound, printed pages within a physical medium and a hybrid print system integrated within the physical medium, where the hybrid print system is designed to determine a page number at which the physical medium is opened for reading. In some implementations, the hybrid print medium may have printed pages that may include portions of a circuit, and as pages are read and turned, the pages read may form a larger and larger circuit. Further, the circuits on the printed pages may be connected to a power source and sensors for determining a current running through different portions of the circuit formed from the pages in contact with each other. In this way, the hybrid print medium may determine a current page being read, the hybrid print medium may provide this current page to a synchronization service or directly to an electronic device.

As one example, in cases where a user is reading the same content on the hybrid print medium and one or more electronic devices, the hybrid print medium may transmit a page number corresponding to where the physical medium is opened to a synchronization service. The synchronization service may then provide the page number to one or more of the electronic devices that are storing an electronic version of the content on the hybrid print medium so that the one or more electronic devices may display the current page number of the electronic version when the user begins reading the content on the electronic device. In this way, for example, the user, reading the content printed in the hybrid print medium, without any overt effort, may close and put down the hybrid print medium at home and begin reading an electronic version of the content on a mobile device on the train ride to work—where the current reading location of the electronic version on the mobile device is automatically updated and synchronized to the last page read on the hybrid print medium.

In addition to the synchronization service receiving a page number from the hybrid print medium the synchronization service may receive current reading location information from the multiple devices on which the user is reading the same content. In this way, the synchronization service may determine the page number or reading location corresponding to the furthest reading progress through the content. For instance, each time a user finishes a reading session on a reading medium (e.g., electronic device, hybrid print medium, etc.) the medium may transmit the page (or other way location) of the content that the user last read and the synchronization service may update the user's "last page read" field for that particular content to reflect this page, as discussed in further detail below.

In performing the synchronization for multiple users, the synchronization service may also maintain account information for the multiple users. The synchronization service may also maintain mapping information that corresponds respective reading locations between the various presentations of content among different electronic devices and the hybrid print medium. In some cases, the hybrid print medium may transmit an open page number to the synchronization service in response to an event such as opening or closing the hybrid print medium. Further, the hybrid print medium may also, with permission of the user, transmit page number information to a social media network associated with the user of the hybrid print medium, and in this way, the reading activities of the user may be automatically provided to the user's social media network.

In other implementations, the hybrid print medium may communicate directly with an electronic device on which the same content is stored. For example, a user may be reading content on a hybrid print medium and the use may also have downloaded the same content to an electronic reader. In this example, in response to the user closing the book after reaching a given page in the hybrid print medium the hybrid print medium may detect the presence of the electronic reader and transmit a message to the electronic reader, where the message indicates the page number. In this way, when the user begins reading the same content on the electronic reader, the electronic reader may display a reading location in the electronic version of the content that corresponds to the received page number. In other words, the hybrid print medium and the electronic reader may synchronize directly. Similarly, the electronic reader, after the user reads additional content, may transmit synchronization information back to the hybrid print medium either directly or through the synchronization service. In this example, the synchronization information may be a reading location that is used by the synchronization service or hybrid print medium to determine a corresponding page number in the hybrid print medium or the synchronization information may be a page number in the hybrid print medium.

In different implementations, the hybrid print medium may be in the form of a paper book or some other bound physical collection of pages, and the content may include images or text or both.

FIG. 1 illustrates a computing environment 100 that includes an example implementation of a hybrid print medium, a synchronization service, and multiple electronic devices. As depicted, hybrid print medium 102 is in the form of a traditionally bound, physical book, and may communicate over network 104 with synchronization service 106 and one or more of electronic devices 108.

Further, in this example, hybrid print medium 102 may include hybrid print system 110. As depicted, hybrid print medium 102 may include software and/or hardware modules configured to perform the processing features described in this disclosure. For example, as described further below, sensor processing module 112 may be configured to perform features related to determining across which pages a circuit is carrying current. Synchronization module 114 may be configured to perform features related to synchronizing content between hybrid print medium 102 and a synchronization service or other electronic devices. As described further below, power source 116 may be used in powering a circuit formed across printed pages and sensors 118 may be used in determining a last page across which current for the circuit is running. In different cases, power source 116 may be powered by a battery, solar cells, or connected to an external power source.

Additionally, in some implementations, hybrid print system 110 includes one or more processors 120(1)-120(X) coupled to memory 122. The processor(s) 120(1)-120(X) can be a single processing unit or multiple processing units, all of which can include single or multiple computing units or multiple cores. The processor(s) 120(1)-120(X) can be implemented as one or more microprocessors, microcomputers, microcontrollers, digital signal processors, central processing units, state machines, logic circuitries, and/or any devices that manipulate signals based on operational instructions. As one example, the processor(s) 120(1)-120(X) may be one or more hardware processors and/or logic circuits of any suitable type specifically programmed or configured to execute the algorithms and processes described herein. Among other capabilities, the processor(s) 120(1)-120(X) can be configured to fetch and execute computer-readable instructions stored in the memory 122 or other computer-readable media or other computer-readable devices. Computer-readable media includes, at least, two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device.

By contrast, communication media may embody computer-readable instructions, data structures, program modules, or other data in a modulated data signal, such as a carrier wave, or other transmission mechanism. As defined in this disclosure, computer storage media does not include communication media.

The memory 122, including data storage 124, is an example of computer storage media. Further, hybrid print system 110 may include one or more communication interfaces 126 that may facilitate communications between computing devices. In particular, the communication interfaces 126 may include one or more wired network communication interfaces, one or more wireless communication interfaces, or both, to facilitate communication via one or more networks represented by a network. The network may be representative of any one or combination of multiple different types of wired and wireless networks, such as the Internet, cable networks, satellite networks, wide area wireless communication networks, wired local area networks, wireless local area networks, public switched telephone networks (PSTN), and the like.

Additionally, hybrid print system 110 may include input/output devices 128. The input/output devices 128 may include a touch screen, one or more microphones, a display, speakers, and so forth.

The memory 122 within the hybrid print system 110 may include program instructions 130 configured to implement each of the implementations described in this disclosure. Further, in different implementations, the cache(s) 132 may include an instruction cache and/or data cache, which may be used in processing program instructions 130. In one implementation, the program instructions may include software elements of implementations of the modules discussed in this disclosure. The data storage within the computer system may include data that may be used in other implementations.

Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes.

Figure 2:
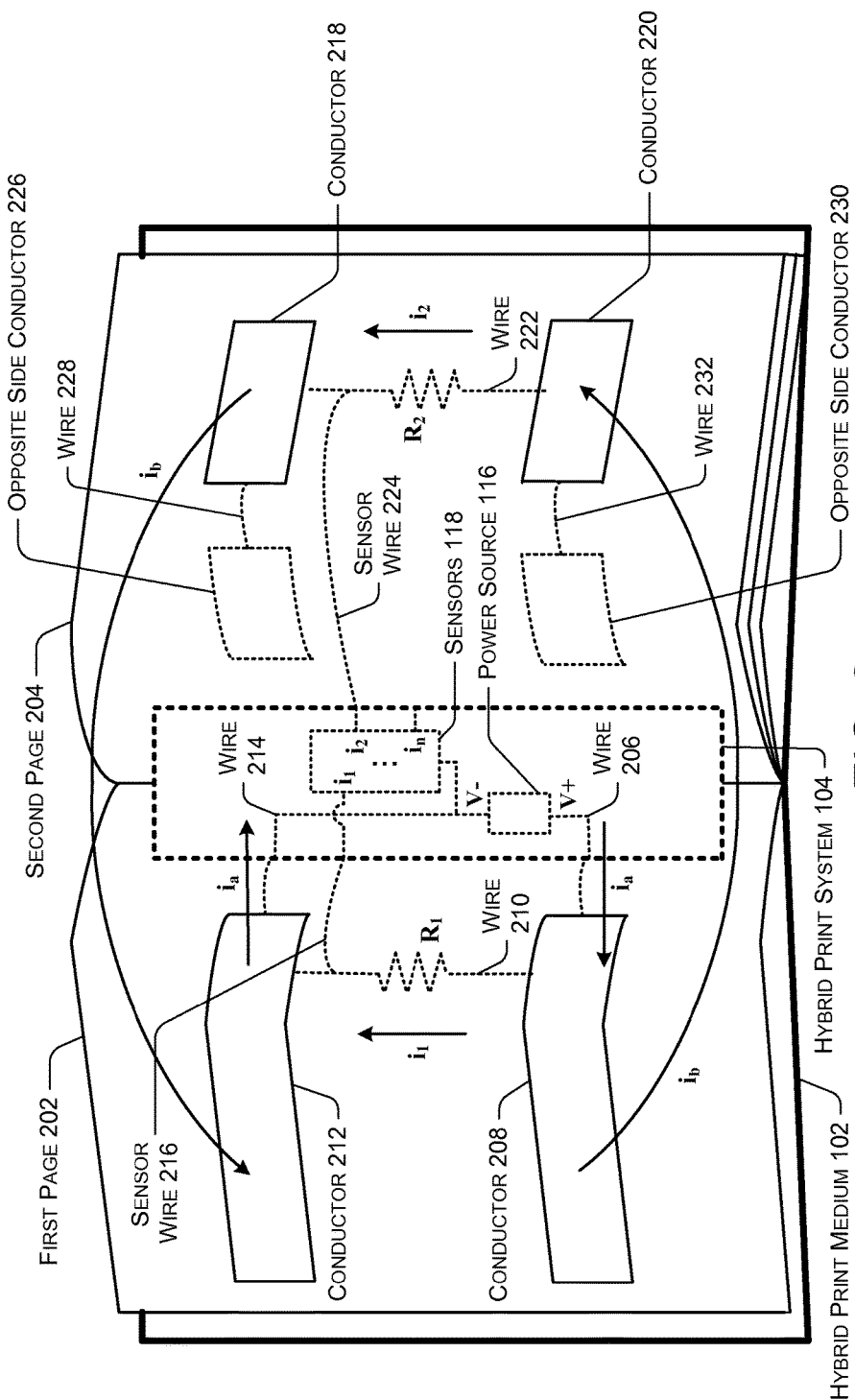
FIG. 2 illustrates example components and pages of a hybrid print medium according to some implementations.

FIG. 2 illustrates components and features of a hybrid print medium, according to some implementations. In this example, hybrid print medium 102 takes the physical form of a traditional printed book with bound pages. However, hybrid print medium 102 integrates a hybrid print system as discussed above in regard to FIG. 1. In this example, hybrid print system 110 is included within the spine of the cover of hybrid print medium 102. In other cases, hybrid print system 110 may be included within one or more of the book covers instead of or in addition to being included within the spine. Further, the pages of hybrid print medium 102 include portions of a circuit of resistors in parallel, where the circuit expands to include additional resistors as pages are turned.

Hybrid print medium 102, based at least in part on detecting current running through the portion of the circuit on a given page may determine a current open page, and the current open page information may then be provided to a synchronization service or to an electronic device.

In this example, hybrid print medium 102 is open to the first page of the book, depicted by first page 202 on the left and second page 204 on the right. In this example, a page refers to a physical page, and not to a page number. As depicted in this example, first page 202 includes the first portion of a circuit that goes from the output of power source 116, along wire 206, through conductor 208, along wire 210, across resistor $R_1$, through conductor 212, and along wire 214 back to the input of power source 116. In response to power being supplied from power source 116, with the first page open, the parallel circuit includes a single resistor, $R_1$, and current $i_1$ is equal to current $1_a$.

Further, in response to power being supplied to the first page circuit, current also flows through sensor wire 216, and sensor wire 216 is connected to sensors 118. Sensors 118 are configured to detect current present in the input wires, and in this example, there is an input wire corresponding to each page of hybrid print medium 102, indicated by $i_1 \ldots i_n$. Further in this example, each page of hybrid print medium 102, similar to first page 202, includes a portion of a circuit that includes a wired connection to sensors 118 such that the wired connection carries current when the respective portions of the circuit carries current.

Second page 204 includes portions of a circuit configured and positioned within the printed page such that when second page 204 makes contact with first page 202, the second page portions of the circuit make contact with the first page circuit and expand the size of the first page circuit. As noted above, in this example, in response to the first page being open, current runs through the first page circuit along the current path corresponding to wires 206, 210 and sensor wire 216. However, in this example, first page 202 has connections to and from power source 116, but no other pages have connections to the power source. Therefore, in this example, the circuit portions of the other pages become live and carry current in response to making contact with the live circuit in the first page, but not otherwise.

Further, the design and location of the circuit portion on the second page is such that in response to second page 204 being turned and comes to rest on top of first page 202, conductor 218 makes contact with conductor 212 and conductor 220 makes contact with conductor 208. In response to the contact from conductor 208 with conductor 220 and conductor 212 with conductor 218, current begins to flow from wire 206, along conductors 208 and 220, through wire 222 and resistor $R_2$, along conductors 218 and 212, and along wire 214 back to power source 116. In response to current running through the circuit portion on second page 204, sensor wire 224 carries current to sensors 118. In this way, hybrid print system 104 may determine that second page has been turned, and that the user is now reading the next page in hybrid print medium 102.

Further in regard to the design and location of the circuit portion on the second page, conductors 218 and 220 are configured to make contact in response to second page 204 being turned to meet first page 202. However, as depicted in FIG. 2, opposite side conductor 226 is connected to conductor 218 through wire 228, but opposite side conductor 226 is configured within second page 204 to not make contact with conductor 212 when second page 204 is turned to rest on first page 202. In this example, opposite side conductor 230 is connected to conductor 220 through wire 232, and opposite side conductor 230 is configured similarly to opposite side conductor 226, where opposite side conductor 230 does not make contact with conductor 208 when second page 204 is turned and meets first page 202.

For example, the conductors in hybrid print medium 102 may be made of a metallic, conductive ink that is printed on the page, and where the conductivity of the metallic ink is on one side of a page but not the other. In other cases, the conductors in the pages of hybrid print medium 102 may be made of other conductive materials that serve to create an electrical circuit. Further, while in this disclosure "wire" has been selected to be the terminology for the depicted connections, this terminology does not suggest any particular type of material. Rather, the wires may be metallic ink, metal, or some other conductive substance capable of carrying an electrical current. Further, in different implementations, to prevent crossed wires, the wires may be positioned such that there is no contact when pages are in contact. In other cases, contact may be prevented through the embedding of wires within the pages, in which case, positioning of the wires to prevent contact is not a factor.

In this example, resistors $R_1$ and $R_2$ are in parallel in the circuit across first page 202 and second page 204, and the currents running through the circuit are characterized according to Ohm's Law with regard to resistors in parallel. In this example, given a live circuit including the circuit portion of first page 202 and the circuit portion of second page 204, and given V as the voltage from power source 116, then current $i_1=V/R_1$, $i_2=V/R_2$, $i_a=i_1+i_b$, and $i_b=i_2$. As the circuit includes additional pages, the same characteristics properties specified by Ohm's Law hold. However, while these electrical properties are provided for insight into the depicted circuits, in some implementations hybrid print system 104 and sensors 118 may determine the extent of the circuit, and the further page included in the circuit by the mere presence of current along input wires to sensors 118. Further, while the depicted circuits in hybrid print medium 102 include resistors, in other implementations, instead of resistors as depicted in FIG. 2, the connecting wires themselves may provide the resistance.

Figure 3A:
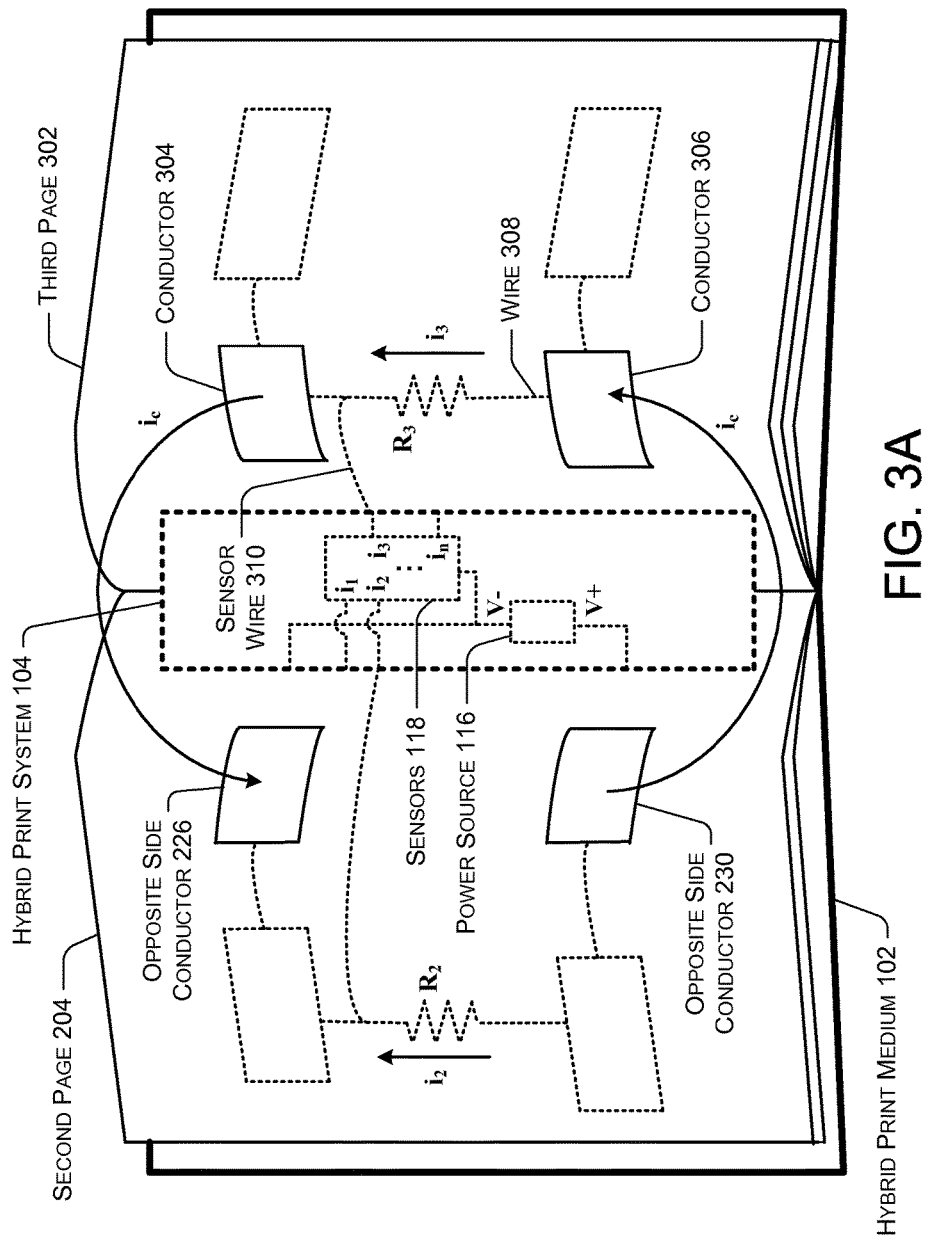
FIGS. 3A-3C further illustrate example components and pages of a hybrid print medium according to some implementations.

FIG. 3A illustrates additional components and features of the implementation of hybrid print medium 102 described above in regard to FIG. 2. In FIG. 2, hybrid print medium 102 is opened to the first page, allowing a user to read page numbers one and two, and in FIG. 3, hybrid print medium 102 is opened to the next page, allowing the user to read page numbers three and four. As described above, first page 202 has a configuration of conductors and wires different from the configuration of conductors and wires on second page 204. In this example, the configuration of the conductors and wires on third page 302 allow for the circuit including the first page 202 circuit and the second page 204 circuit to expand to include the third page 302 circuit.

In response to third page 302 being turned and making contact with second page 204, the live circuit including the circuit portions from first page 202 and second page 204 is expanded to include conductor 304, resistor $R_3$, wire 308, and conductor 306. Further, in response to the live circuit expanding, current also flows through sensor wire 310 to sensors 118. In response to detecting current on input i3 of sensors 118, hybrid print system 104 may determine that third page 302 has been turned and is resting on second page 204, based on the contact made between opposite side conductor 226 with conductor 304 and contact made between opposite side conductor 230 and conductor 306.

In this example, conductor 304 is positioned within page three 302 to make contact with opposite side conductor 226 in response to third page 302 being turned such that third page 302 meets and rests on second page 204. Further in this example, in response to the same page turn, conductor 306 is positioned within page three 302 to make contact with opposite side conductor 230 in response to third page 302. In the manner that the conductors on second page 204 and third page 302 are mirrored such that the conductors, when the pages meet, make contact, the conductors on subsequent pages, when the subsequent pages make contact, are similarly mirrored. Further, the pattern of conductors being conductive on a single side of a page, as described for second page 204 and third page 302, is similarly repeated for subsequent pages of hybrid print medium 102.

To continue this example, as each subsequent page is turned, the live circuit is expanded to include the circuit portion on the last turned page, and a corresponding sensor wire also becomes live and provides a current reading at sensors 118. In this way, the hybrid print system 104, may determine a last page turned, and a corresponding page number, and transmit a synchronization message specifying this information to a synchronization service or directly to an electronic device.

Further, hybrid print system 104 may determine that hybrid print medium 102 has been closed in response to all of the sensor wires carrying current. In some implementations, hybrid print system 104 may transmit a synchronization message in response to detecting that hybrid print medium 102 has been closed. In other examples, hybrid print system 104 may periodically or aperiodically transmit synchronization messages. In other examples, hybrid print system 104 may determine that the user has stopped reading if a page has not been turned in amount of time that is greater than the average reading speed of the user, as measured by an average page turn speed for the given hybrid print medium. In some implementations, the hybrid print medium may also use the average page turn speed in determining a last page read. For example, if a hybrid print medium has been dropped or otherwise randomly opened to a page, the opened page may be determined to not be the last page read if the opened page is not kept open for a period of time greater than or equal to the average page turn speed. Further, in some cases, the average page turn speed may be used in combination with pages previously determined to have been read. For example, if a book is dropped and opens to page X and the hybrid print medium, prior to being opened to page X has determined that pages 1-Y have been consecutively read, where there is more than one page between page X and Y, then the hybrid print medium may determine not to update the last page read. However, to continue this example, if the hybrid print medium detects that consecutive pages after page X are being consecutively read, then after the consecutively read pages, the hybrid print medium may determine to update the last page to the last of the consecutively read pages after page X.

Further, to conserve power, hybrid print system 104 may turn power on or off for power source 116 based on a determination of the hybrid print medium being opened or closed. In other implementations, hybrid print medium 102 may, periodically or aperiodically, turn on power supplied from power source 116 in order to determine a presently opened page, and in response to determining a presently opened page, turn off or reduce power supplied from power source 116. For example, given a determined average reading time per page, hybrid print medium 102 may determine how frequently to determine a presently opened page based on the average reading time per page. For example, if the average reading time per page is 3 minutes, then hybrid print medium 102 may awake and determine a presently opened page at intervals less than 3 minutes, and after the presently opened page has been determined, enter a low-power mode.

Figure 3B:
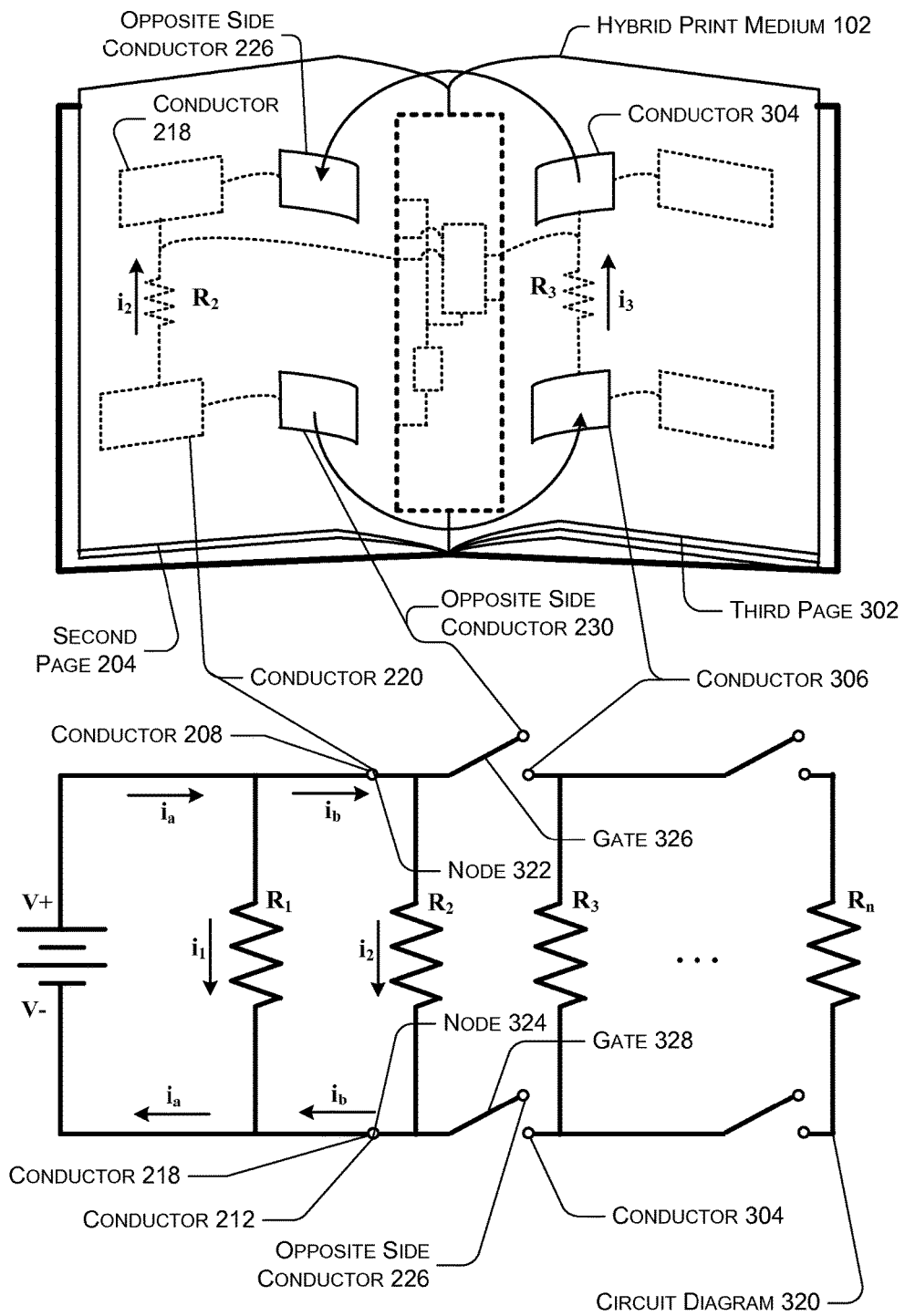

FIG. 3B illustrates the components and features of the implementation of hybrid print medium 102 described above in regard to FIG. 3A in correlation with parallel circuit diagram 320. In this example, as in FIG. 3A, hybrid print medium 102 is opened to second page 204, and conductor 220 and conductor 218 on second page 204 are in contact with, respectively, conductor 208 and conductor 212 on first page 202. Therefore, in this example, the live circuit includes the circuit components of first page 202 and second page 204. As depicted, first page 202 and second page 204 are in contact, and this contact is reflected in nodes 322 and 324 being closed, and circuit diagram 320 including resistors $R_1$ and $R_2$. Further, as depicted in circuit diagram 320, given that second page 204 and third page 302 are not in contact with each other, opposite side conductor 230 on second page 204 is not in contact with conductor 306 on third page 302 and opposite side conductor 226 is not in contact with conductor 304. Correspondingly, as depicted in circuit diagram 320, gates 326 and 328 are open, preventing additional resistors from being part of the live circuit.

Figure 3C:
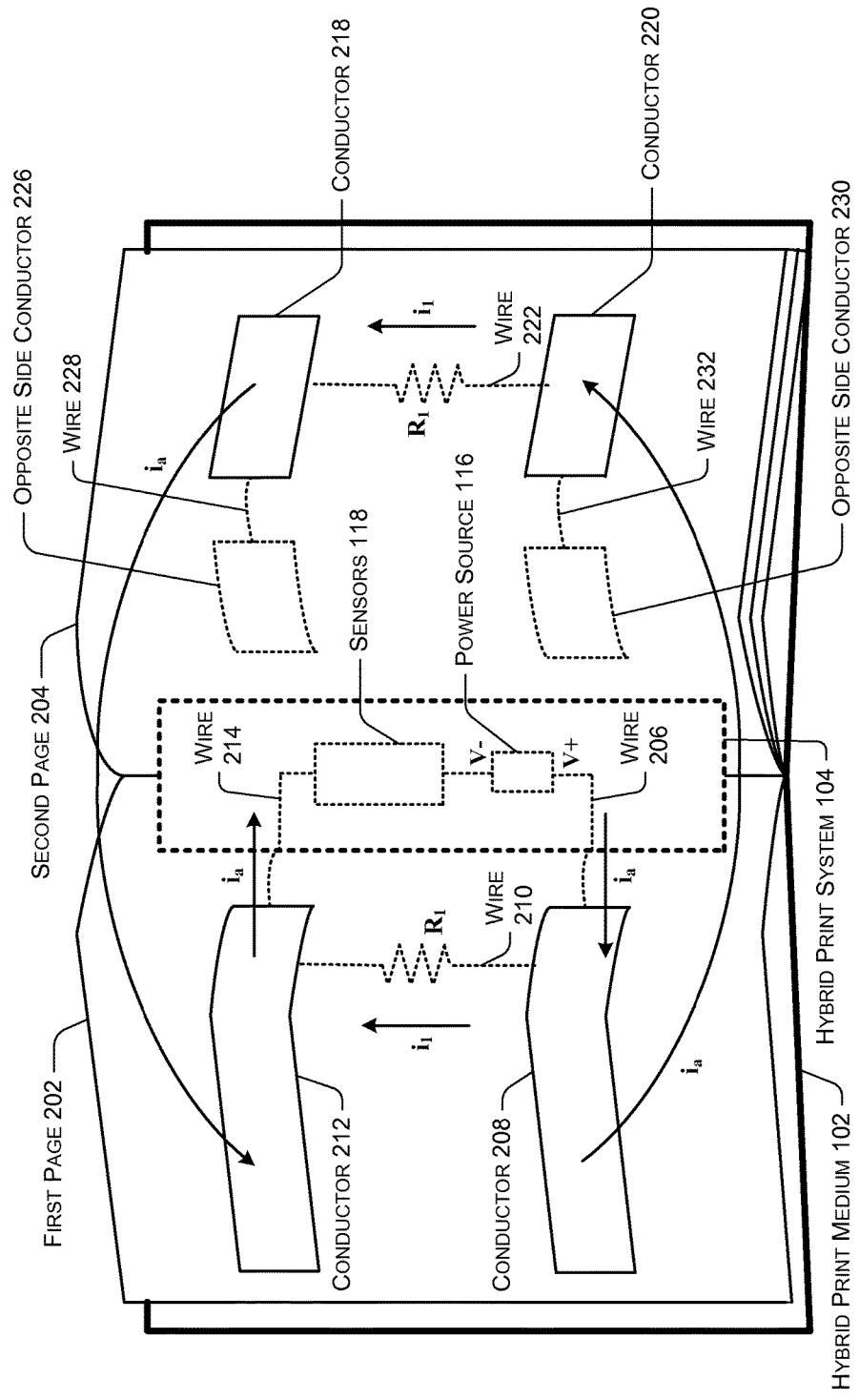

FIG. 3C illustrates components and features of another implementation of hybrid print medium 102. However, in contrast to the implementation described above in regard to FIGS. 3A and 3B, where each page includes a sensor wire to sensors 118, in FIG. 3C, first page 202 includes a wire, wire 214, that is an input to sensors 118, but the remaining pages do not include a wire to sensors 118. As noted above, a relationship between current, voltage, and resistance may be represented as V=I*R. In this example, when first page 202 is opened, current may flow from power source 116, through wire 206, conductor 208, wire 210, resistor $R_1$, conductor 212, and wire 214 into sensors 118 and, closing the circuit, back into power source 116. In this implementation, for computational simplicity, each resistor on each page of hybrid print medium 102 may be defined to be of a same resistance, however, different resistor values may be used and the same electrical relationships and calculations would hold.

Continuing with this example, voltage for power source 116 may be a known quantity, and the resistance provided by each resistor may also be a known quantity, therefore, given a measure of an amount of current at sensors 118, hybrid print medium 102 may determine across how many resistors the current has flowed. Further, given that in this implementation, there is a single resistor in the components of the circuit for each page, the number of resistors determined may correspond to a number of pages included in the live circuit, thereby providing a presently opened page of hybrid print medium 102.

For example, given voltage V, and each resistor on each page providing the same $R_1$ amount of resistance, hybrid print medium 102 may use sensors 118 to measure an amount of current, I. In a parallel circuit, as resistors are added, the overall, equivalent resistance provided by the resistors may be represented by $1/R_{eq} = 1/R_1 + 1/R_2 + \ldots + 1/R_x$. In other words, given that $R_1$ through $R_x = R_1$, $R_{eq} = R_1/x$, with x being the number of pages presently forming the live circuit. Given that V=I*R, then $V = I*R_{eq}$, or $V = I*(R_1/x)$, or $x = (I*R_1)/V$. In this way, given a measure of current I, hybrid print medium 102 may determine across how many resistors, and consequently, across how many pages, current is flowing, thereby providing a determination of a presently opened page of the book.

Figure 4:
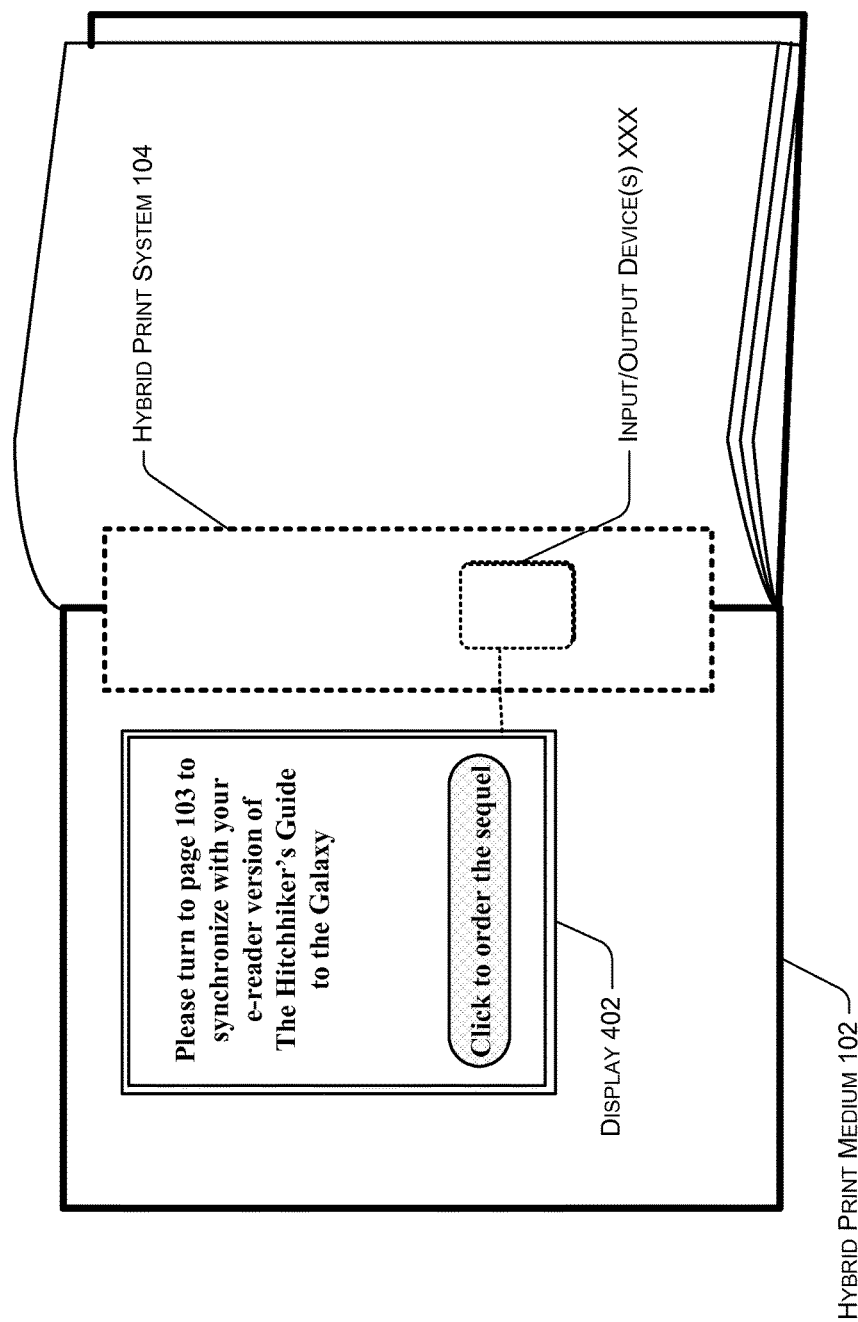
FIG. 4 illustrates a hybrid print medium with a display according to some implementations.

FIG. 4 illustrates an example implementation of a hybrid print medium depicting features for providing synchronization feedback to a reader of the hybrid print medium. As described above, a hybrid print medium may transmit synchronization messages to a synchronization service or to an electronic device. In this way, when a user finishes reading content on the hybrid print medium, and begins reading the same content on an electronic device, the user may continue reading at a reading location in the electronic version of the content that corresponds to the last physical page read in the hybrid print medium. However, if the user reads additional portions of the content on the electronic device, when the user begins reading the hybrid print medium, the user may need to advance a certain number of pages to be on a page that corresponds with the last read reading location on the electronic device. In this example, to provide the user with information for synchronizing with a current reading location on an electronic device, the hybrid print medium includes a display to inform a user about which page number in the hybrid print medium to turn.

For example, hybrid print medium 102 may include a display 402 for displaying messages to a user, such as a page number to turn to in order to continue reading where the user left off on an electronic device. In some cases, the display may also provide an interface for performing actions such as placing an order. In cases, where the hybrid print medium is the last medium on which the user read the content, display 402 may simply inform the user of the last page read, without reference to a device. Further, the display may configured to communicate with input/output device 128.

Figure 5A:
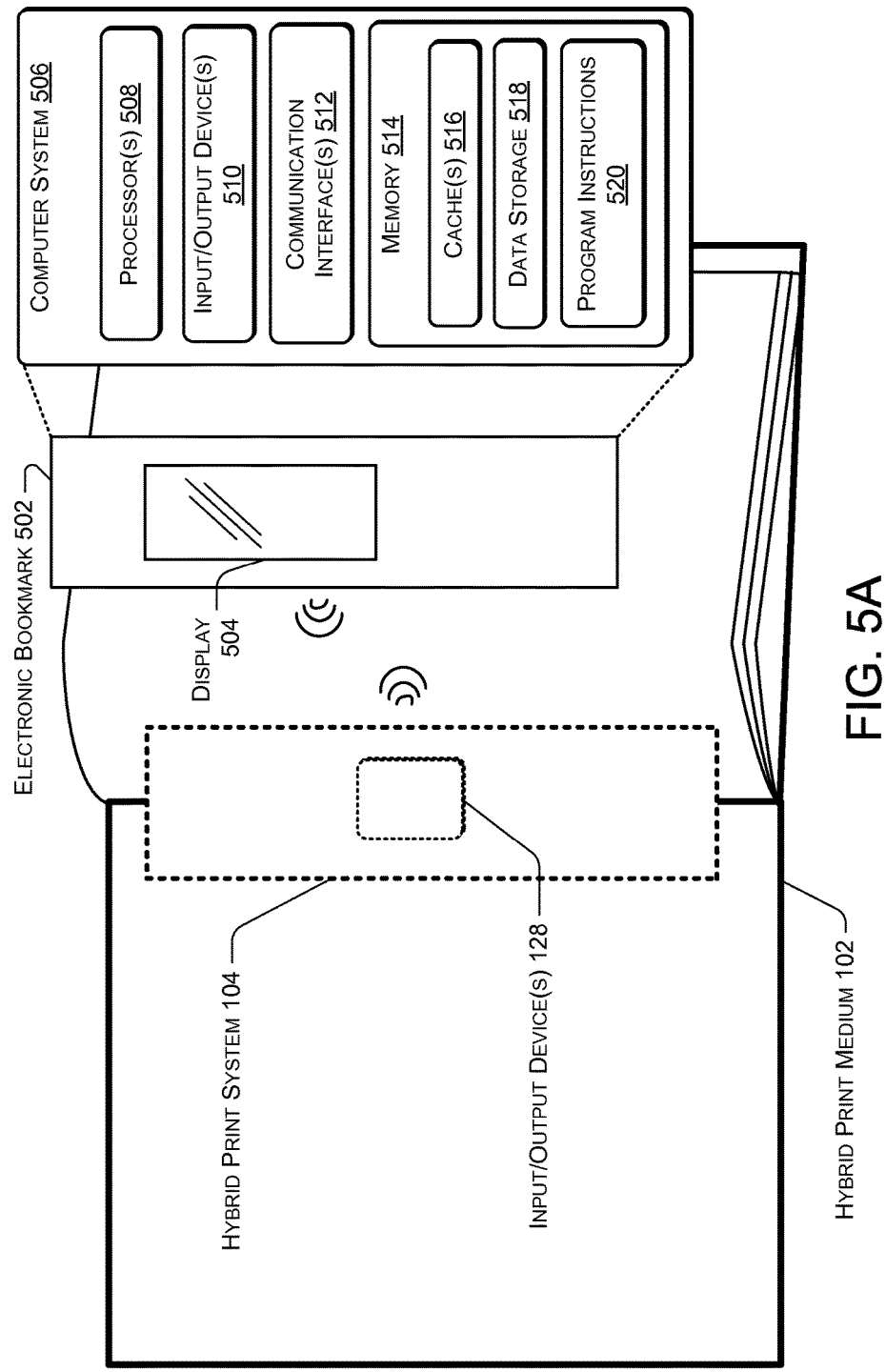
FIG. 5A illustrates a hybrid print medium in communication with an electronic book mark according to some implementations.

FIG. 5A illustrates another example implementation of a hybrid print medium depicting features for providing synchronization feedback to a reader of the hybrid print medium. In this example, instead of providing information to a user through a built-in display of the hybrid print medium, hybrid print medium 102 may communicate wirelessly with an electronic bookmark. As depicted, electronic bookmark 502 includes a display, display 504, for providing information to a user. The electronic bookmark is designed such that the length, width, and depth, of the electronic bookmark are sufficiently small so as to fit between the closed pages of a hybrid print medium.

Similar to the example described above with regard to FIG. 4, the information provided to a user may instruct a user to turn to a certain page in order to continue reading from a reading location on an electronic device where the user was reading the same content. Further, electronic bookmark 502 includes computer system 506, where computer system 506 includes processors 508, input/output devices 510, communication interfaces 512, and memory 514, which in turn includes cache(s) 516, data storage 518, and program instructions 520.

Figure 5B:
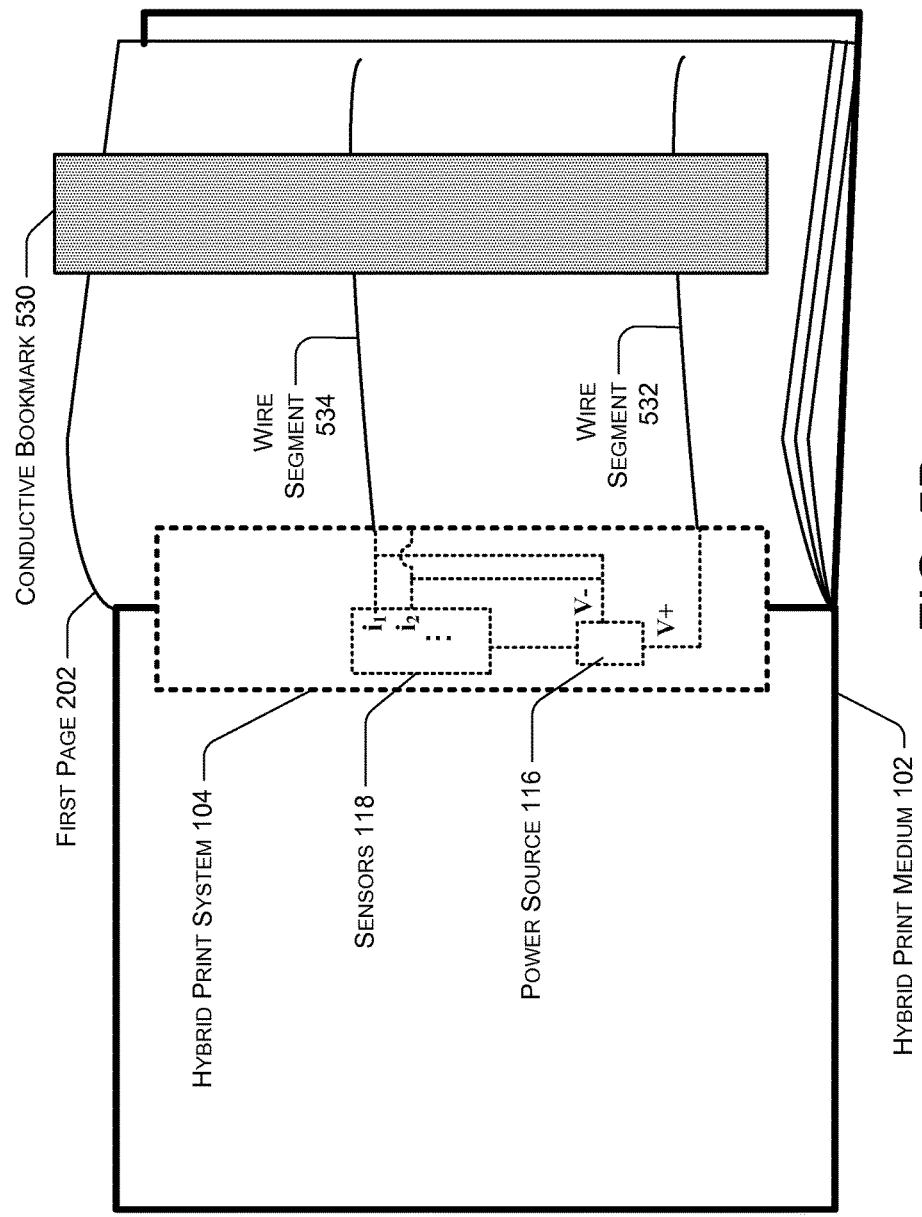
FIG. 5B illustrates a hybrid print medium using a conductive bookmark to determine a current page according to some implementations.

FIG. 5B illustrates an example implementation of a hybrid print medium depicting features for determining a current page being read using a conductive bookmark. In this example, instead of expanding a circuit as additional pages are turned as described above, each page of a hybrid print medium includes two wire segments that form a complete circuit when a conductive material connects the two wire segments. In some cases, the wire segment may be metallic ink or some other conductive material printed or otherwise included within a page.

For example, as depicted in FIG. 5B, a conductive bookmark 530 may connect wire segments 532 and 534 when conductive bookmark 530 is on top of wire segments 532 and 534. Conductive bookmark 530 may be made of any conductive material such as copper, gold, or among other conductive materials. Such a connection may be established when conductive bookmark 530 is placed in hybrid print medium 102 on top of, for example, first page 202 and hybrid print medium 102 is closed. In response to closing hybrid print medium 102, current may flow from power source 118 across wire segment 532, through conductive bookmark 530, and across wire segment 534, where wire segment 534, goes to both an input corresponding to the page and also back to the power source, where the circuit is completed. In general, each page of hybrid print medium 102 may have a wire segment that both returns to the power source 116 and also to an input to sensors 118 that corresponds to the particular page. In this way, when hybrid print medium 102 is closed, conductive bookmark 530 may complete a single circuit on a single page, where the completion of the single circuit provides a current input to sensors 118 such that sensors 118, based on the input current, may determine the page corresponding to the completed circuit. Upon determining a page number on which the book mark was placed, hybrid print system may use the page number information as described in other implementations.

Figure 6:
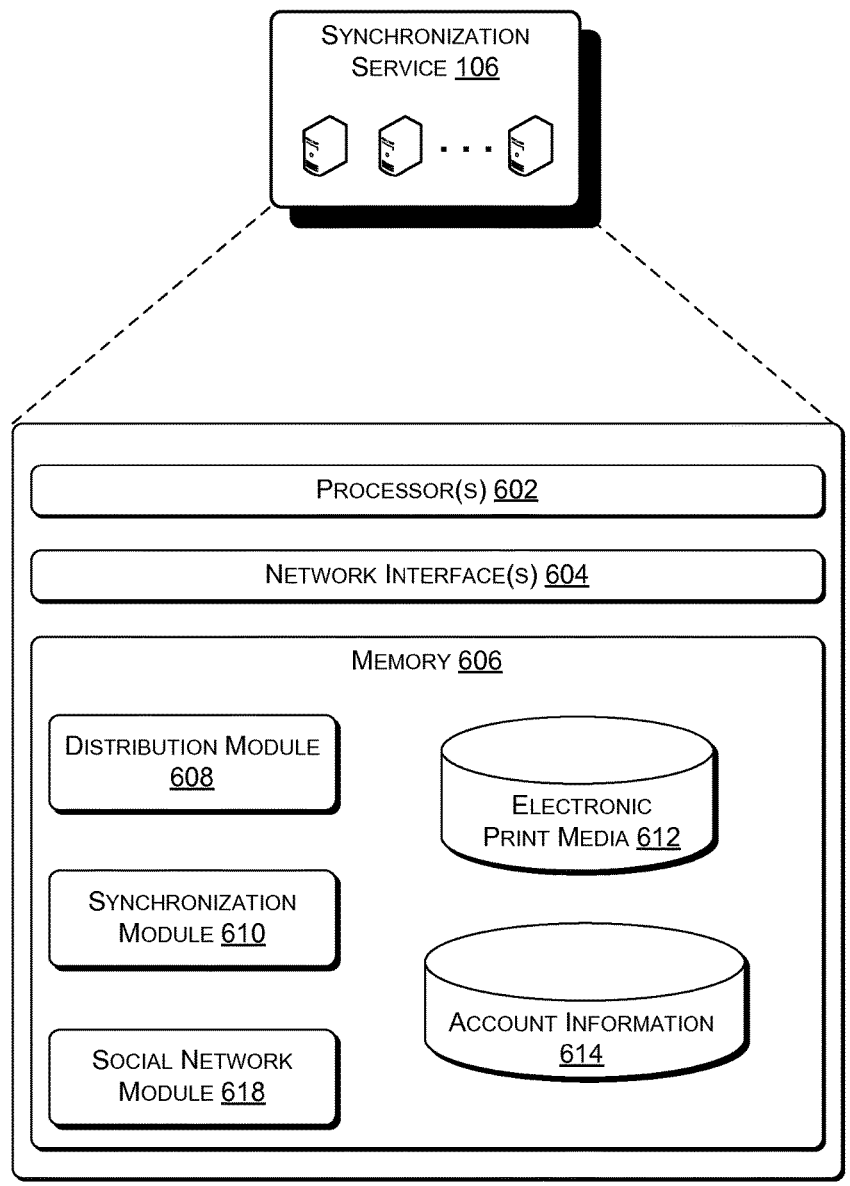
FIG. 6 illustrates system components of a synchronization service according to some implementations.

FIG. 6 illustrates additional features and components of synchronization service 106. As discussed above, a synchronization service may synchronize reading locations between different electronic devices and between hybrid print media so that a user reading the same content on different ones of the electronic devices and hybrid print medium, may conveniently know a current reading location.

A reading location may refer to a physical page in a physical version of content or to an index in some other division of the physical version that may be used in an electronic version of the physical version. For example, the reading location may be indexed to a byte count so that the reference number is invariant if changes are made to font, line spacing, or some other formatting change of the electronic version of the physical version. In this case, reading location indices may be mapped to page numbers of the physical version. In this way, a reading location may be used to identify a same point within content whether the content is in a physical version on a hybrid print medium or in different formats in different electronic versions on one or more electronic devices.

In some implementations, synchronization service 106 receives a reading location associated with an electronic version of the content from an electronic device. Upon receiving the reading location, synchronization service 106 may determine if it has previously received a page number from a hybrid print medium of the content or a reading location from an electronic device associated with a same user account. For, example, the hybrid print medium may be associated with a same user as the electronic copy or with a contact of the user of the electronic copy, and this information may be stored and maintained by synchronization service 106.

Synchronization service 106 may synchronize a page number received from a hybrid print medium and reading locations from electronic devices to determine a furthest read page or a most recently viewed page, and provide the result of the synchronization as a synchronization page suggestion to an electronic device or hybrid print medium. In some implementations, the synchronization service may not have previously received or derived a page number of a physical copy of the print medium. The user of an hybrid print medium may then flip to a page in the physical version of the content that corresponds to a synchronization page suggestion. In some cases, the synchronization page suggestion is provided in response to a request from the hybrid print medium or an electronic device, the request being generated responsive to an event such as the opening of the hybrid print medium or powering up or reviving from a sleep state for an electronic device.

In some implementations, in addition to providing a synchronization page suggestion, synchronization service 106 may provide a purchase suggestion. For example, if synchronization service 106 receives a page number from a hybrid print medium, and the user associated with that physical version does not own a corresponding electronic version, synchronization service 106 may provide a suggestion that the user purchase the electronic version. Such a suggestion, which may include a price and even a mechanism for initiating a purchase, may be rendered by the hybrid print medium or by an electronic bookmark for a hybrid print medium.

As noted above, synchronization service 106 may also provide a synchronization page suggestion to the electronic devices having the electronic versions of the content. In such a case, upon receiving a synchronization page suggestion, an electronic device may either automatically update current reading locations based on the synchronization page suggestion or may render the synchronization page suggestion to a user to enable the user to choose whether or not to update the current reading location. In some cases, the synchronization page suggestion is only provided to the electronic devices having the electronic versions of the content in response to requests for a synchronization page suggestion.

As illustrated in FIG. 6, one or more devices comprising a synchronization service 106 include processor(s) 602, network interface(s) 604, and memory 606. Memory 206 in turn may include a distribution module 608, a synchronization module 610, electronic print media 612, account information 614 and a social network module 618.

In some implementations, synchronization service 106 is implemented on one or more computing devices. For example, the computing device(s) of the synchronization service 106 may be or include a server or server farm, multiple, distributed server farms, a mainframe, a work station, a personal computer (PC), a laptop computer, or any other sort of device or devices. In one implementation, the computing device(s) of synchronization service 106 represent a plurality of computing devices working in communication, such as a cloud computing network of nodes. When implemented on multiple computing devices, synchronization service 106 may distribute the modules and data 608-618 of synchronization service 106 among multiple computing devices.

In some implementations, processor(s) 602 may be or include any sort of processing unit, such as a central processing unit (CPU) or a graphic processing unit (GPU). Network interface(s) 604 allow the device(s) of synchronization service 106 to communicate with electronic devices 108 and hybrid print media. Network interface(s) 604 may send and receive communications through wired networks, wireless networks, and combinations of wired and wireless networks. Further, the network(s) may include any one or combination of multiple different types of public or private networks (e.g., cable networks, the Internet, wireless networks, etc.).

Memory 606 may store an array of modules and data, and may include volatile and/or nonvolatile memory, removable and/or non-removable media, and the like, which may be implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device.

As mentioned, memory 606 includes distribution module 608. Distribution module 608 may be any application, process, thread, or function configured to distribute electronic copies of print media. For example, a user may purchase an electronic version of a print medium, and a notation may be made of the purchase in the account information 614. In some implementations, distribution module 608 may retrieve a list of all electronic devices associated with a purchasing user from the account information 614, may retrieve the purchased electronic version of the print medium from the electronic print media 612, and may provide the retrieved electronic version to one or more electronic devices. In other implementations, distribution module 608 instead awaits requests from electronic devices of a purchasing user. A request may specify the purchased electronic version of the print medium or may generally request any electronic versions of print media associated with the user that are not stored on the requesting electronic device. Upon receiving the request, distribution module 608 authenticates the request with the account information 614, retrieves the electronic versions of print media from the electronic print media 612, and provides the requests electronic versions of print media.

In various embodiments, synchronization module 610 may be any application, process, thread, or function configured to receive page numbers and reading locations, compare those page numbers and reading locations to determine synchronization page suggestions, and provide those synchronization page suggestions to hybrid print media or electronic devices. Further, the synchronization module 610 may construct a reading history for a user or a contact/social network friend of the user from reading locations and page numbers and may use the reading history in deriving page numbers or may provide the reading history to electronic devices or hybrid print media to enable derivation of page numbers.

In some implementations, synchronization module 610 may be configured to provide purchase suggestions to hybrid print media and electronic devices. If the received page number is determined to be from a physical version of a print medium and the user of the physical version is determined not to have an electronic version of the print medium, synchronization module 610 may provide a purchase suggestion that includes information about the electronic version, such as price, and a mechanism enabling purchase of the electronic version.

Electronic print media 612 may be any one or more repositories of electronic versions of print media 612 and may be stored in association with synchronization service 106 or may be stored by a separate service of a same or affiliated entity.

Account information 614 may be any one or more repositories storing information associated with users. For example, a user may be represented by an account identifier in the account information 614, and each account identifier may be associated with identifiers of one or more electronic devices or hybrid print media of the user or identifiers of user profiles on shared hybrid print media or shared electronic device, identifiers of one or more electronic print media purchased or otherwise acquired by the user, information indicating which of the user's electronic devices have electronic versions of which electronic print media, and further information indicating reading locations associated with electronic versions of electronic print media. Also, account identifiers may be associated with identifiers of friends or social network contacts of the user. Additionally, account information 614 may associate an indication of whether the user owning an electronic device also owns a corresponding physical version on a hybrid print medium and may store a current page number in association with that indication.

In some implementations, synchronization service 606 includes a social network module 618 that is configured to publish received page numbers and reading locations to a social network account associated with the user from which the page numbers and reading locations are received. In one implementation, social network module 618 may also calculate a rate at which the user reads physical copies of print media and another rate at which the user reads electronic copies of print media and may publish the rates to the social network account.

Figure 7:
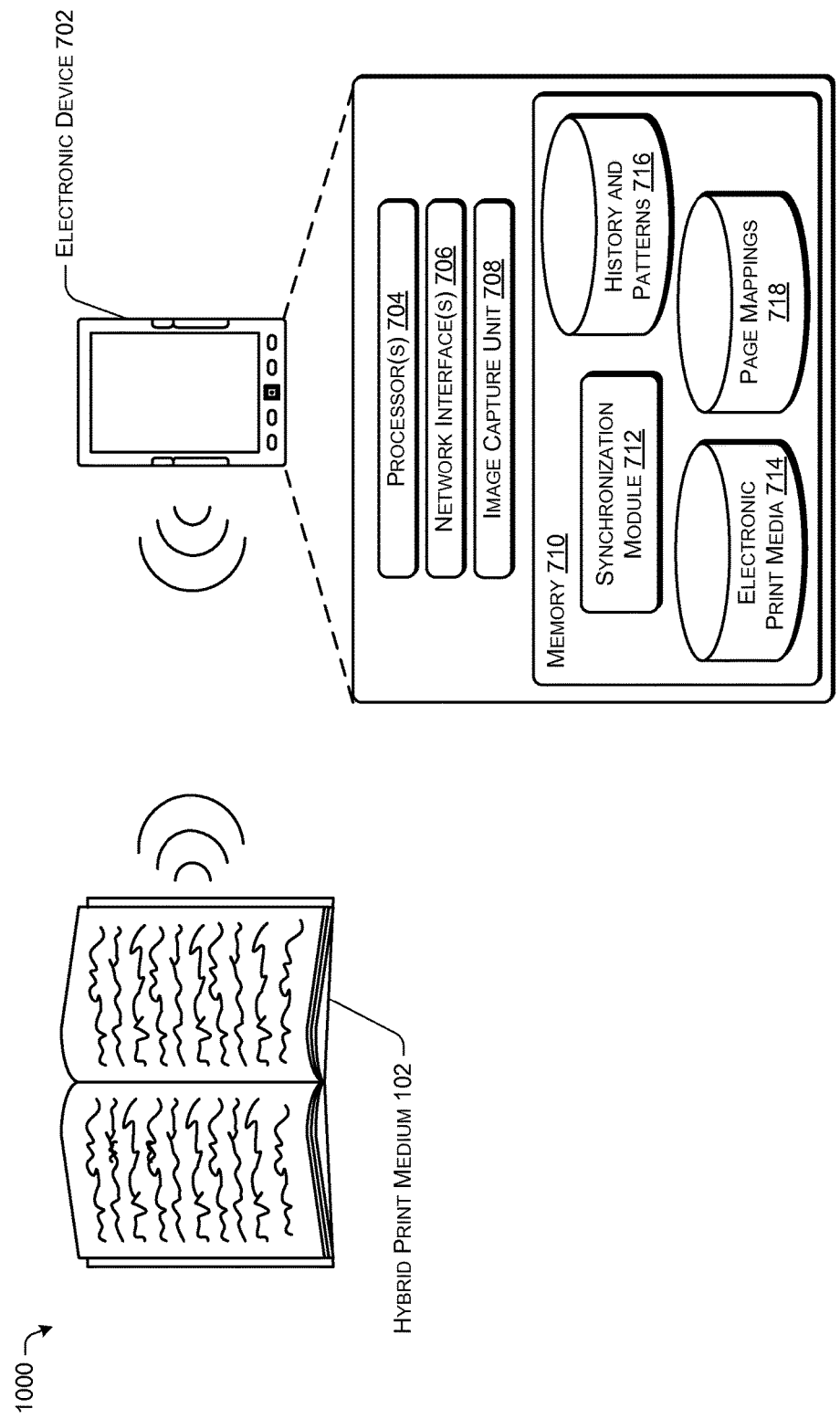
FIG. 7 illustrates an electronic device in communication with a hybrid print medium according to some implementations.

FIG. 7 illustrates an example computing environment 700 that includes a hybrid print medium and an electronic device, as well as an architecture of the electronic device. In this example, hybrid print medium 102 may determine a current page number and then provide the page number directly to electronic device 702. For example, hybrid print medium 102 may detect an electronic device and determine that the electronic device is associated with a reader of hybrid print medium 102. In this way, hybrid print medium 102 may communicate with the electronic device to transmit current reading page information to the electronic device and to request and/or receive current reading locations for the electronic version of the content of hybrid print medium 102. Hybrid print medium 102 may also determine a physical page number that corresponds to the reading location within the electronic version, for example, through referencing mapping information stored in memory 122. Hybrid print medium 102 may then provide synchronization information to the reader either through an instructional message on the display indicating to turn to a particular page, or though providing the particular page to an electronic bookmark for display to the reader.

Electronic device 702 may in turn provide the received page number to synchronization service 106. Further, in response to receiving the page number from hybrid print medium 102, electronic device 702 may update an electronic version that corresponds to the physical version of hybrid print medium 102 to a reading location associated with the page number.

In various implementations, electronic device 702 may be any sort of computing device. For example, electronic device 702 may be an e-reading device, a smart phone or other cellular device, a personal digital assistant (PDA), a tablet computer, a personal computer (PC), a laptop computer, a desktop computer, a media player, a gaming device, among other types of devices. Electronic device 702 may include a display surface, such as liquid crystal display (LCD), a light-emitting diode (LED) display, an electronic paper display, or any other type of display or combination of displays. Electronic device 702 may also include audio components, input components, and other components associated with computing devices. Each electronic device 108, including electronic device 702, may be associated with a specific user and may be tied to that user in account information 614 of synchronization service 106.

As illustrated in FIG. 7, electronic device 702 may include processor(s) 704, network interface(s) 706, image capture unit 708, and memory 710. Memory 710 may include a synchronization module 712, a set of electronic print media 714 associated with the user of electronic device 702, history and patterns 716, and page mappings 718. In some cases, processor(s) 704 may be or include any sort of processing unit, such as a central processing unit (CPU) or a graphic processing unit (GPU). Network interface(s) 706 allow electronic device 702 to communicate with hybrid print media, synchronization service 106, or other devices. Network interface(s) 706 may send and receive communications through wired networks, wireless networks, and combinations of wired and wireless networks.

In some embodiments, the image capture unit 708 comprises any type camera or optics capable of capturing an image of a page. In various embodiments, the image captured by the image capture unit 708 may be a low resolution image or high resolution image. The image capture unit 708 may also include a lighting unit for creating a flash of light that aids in image capture.

Memory 710 may store an array of modules and data, and may include volatile and/or nonvolatile memory, removable and/or non-removable media, and the like, which may be implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device.

As mentioned, memory 710 may include synchronization module 712. Synchronization module 712 may receive a page number from hybrid print media. Also, in some cases, synchronization module 712 derives a reading location within an electronic version of content from a received page number. Further, synchronization module 712 may receive from synchronization service 106 a synchronization page suggestion and may provide the synchronization page suggestion to hybrid print medium 102, may render the synchronization page suggestion, and/or may update a reading location of an electronic copy of the print medium based on the synchronization page suggestion.

In some implementations, electronic print media 714 are versions of electronic print media that have been purchased or otherwise acquired by the user of electronic device 702. Electronic print media 714 may include copies of all such purchased or acquired electronic print media or a downloaded subset of the purchased or acquired electronic print media. Electronic print media 714 may also include a list of electronic print media of contacts or social network friends of the user.

History and patterns 716 may include a reading history of the user of the electronic device 110 and/or reading histories of contacts or social network friends of the user. The reading histories may be locally created based on reading activities of the user on electronic device 702, remotely collected by synchronization service 106 based on reading activities of the user and/or the contact/friends, or may be a combination of locally created and remotely collected data. The patterns may include general patterns (e.g., users reading print media in a single direction) or user-specific patterns (e.g., skipping chapters associated with a certain subject or category). The patterns may be preloaded on electronic device 702, received from synchronization service 106, or generated by electronic device 702.

Page mappings 718 may be associated with electronic print media 714, the history and patterns 716, or both, and may be received from synchronization service 106. Page mappings 718 may also provide mapping information for indexing reading locations in electronic versions of content based on page numbers in a physical version of the content printed in hybrid print medium 102.

Figure 8:
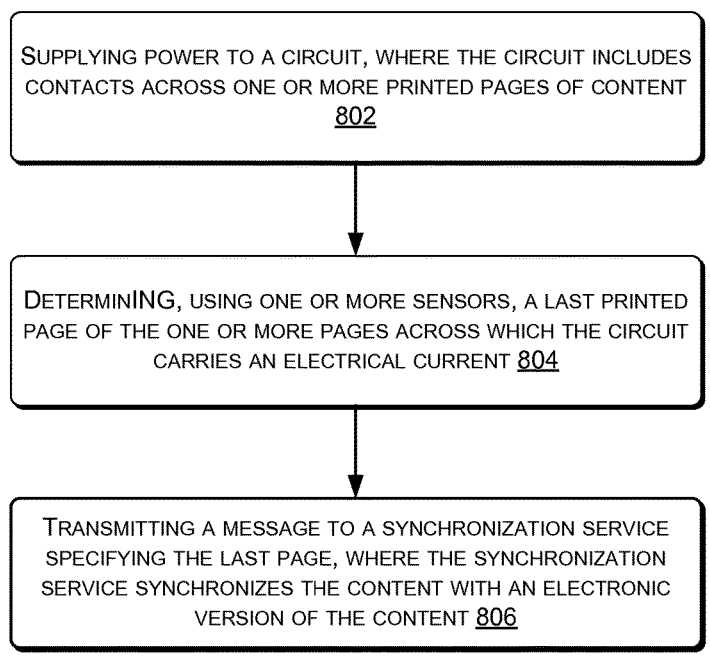
FIG. 8 illustrates a flowchart depicting selected operations of a hybrid print medium according to some implementations.

FIG. 8 illustrates a flowchart 800 depicting, according to some implementations, some of the processing features of a hybrid print medium. In this example, a hybrid print medium such as hybrid print medium 102 provides a synchronization service with a current page number being read, where the page number is provided in response to the user closing hybrid print medium 102.

As described above, as a user reads and turns pages within hybrid print medium 102, the live circuit expands to include the portions of circuits on the turned pages. This live circuit in hybrid print medium 102 is supplied power by power source 116, where the live circuit includes contacts across one or more printed pages of content, as depicted at 802. For example, if the user is on second page 204, as depicted in FIG. 2, the live circuit includes the circuit portion on first page 202.

In this example, hybrid print medium 102 may determine that hybrid print medium 102 has been closed based on the circuit beginning on first page 202 expanding to include the portion of the circuit on a last page of hybrid print medium 102. Further, closure of hybrid print medium 102 may be distinguished between a user reading until the end of hybrid print medium 102 based at least partly on each of the portions of circuits for each prior page having been included in the first page circuit portion. In other words, the user reached the last page after having read and turned the preceding pages, thereby incrementally expanding the live circuit page by page. By contrast to reading until the end, a user may currently be somewhere before the end, and then close the book. In this case, the partial circuit expands from including a subset of the first, say 21 pages, to including the partial circuit on the last page, without having first expanded the partial circuit on the first page to sequentially include all pages preceding the last page. For example, this determination may be based on hybrid print system 104 determining that sensor wires $i_1$-$i_{21}$ have been incrementally become live and carry current, to sensor wire $i_n$ becoming live and carrying current. This determination may further be based on a lack of a delay between the activation of sensor wire $i_{21}$ and sensor wires $i_{21}$-$i_n$. In other words, if hybrid print system 104 has determined an average reading time of, say, 5 minutes per page, then if sensor wires $i_{21}$-$i_n$ become live within a few seconds, hybrid print system 104 may determine that the user closed the book rather than having read the physical pages.

In this example, in response to determining that hybrid print medium 102 has been closed, hybrid print system 104 may determine, based at least partly on sensors 118, a last printed page of the one or more pages across which the circuit had expanded and was carrying an electrical current, as depicted at 804.

To continue the above example, if the user were reading printed page 21 before hybrid print system 104 determined that hybrid print medium 102 had been closed, then hybrid print system 104 may transmit a message to a synchronization service specifying a page number for the last page read, printed page 21, as depicted at 806. Further, the message may include account information or other identifying information for the user in addition to information identifying the content in hybrid print medium 102. The synchronization service may then use the message from hybrid print medium 102 to synchronize hybrid print medium 102 with electronic devices associated with the user on which the user is also reading the same content as on hybrid print medium 102, as also depicted at 806.

FIG. 9 illustrates a flowchart 900 depicting, according to some implementations, some of the considerations in creating a page of a hybrid print medium. As described above, in some implementations, pages of a hybrid print medium may include portions of a circuit that expand as additional pages make contact with a first page.

In this example, a first circuit is included within a first printed page such that a first circuit includes a first pair of contacts on opposite sides of a first resistor, where the first pair of contacts are configured to carry a current supplied from a power source, as depicted at 902. Further in this example, the first printed page may be considered to be first page 202, the first pair of contacts may be considered to be conductors 208 and 212, and the first resistor may be considered to be resistor $R_1$, where current may flow from wire 206, across conductor 208, wire 210, resistor $R_1$, across conductor 212, and through wire 214 back to power source 116. Further, included within the first printed page is a first connection to the first circuit, where the first connection is configured to provide a sensor with an indication of current, as depicted at 904. To continue the example with regard to first page 202, the first connection may be the connection of sensor wire 216 to sensors 118.

In this example, a second circuit is included within a second printed page such that a second circuit includes a second pair of contacts on opposite sides of a second resistor, where the second pair of contacts are configured to carry a current supplied from a power source, as depicted at 906. Further in this example, the second printed page may be considered to be second page 204, the second pair of contacts may be considered to be conductors 220 and 218, and the second resistor may be considered to be resistor $R_2$, where current may flow from conductor 208 on first page 202 to conductor 220, wire 222, resistor $R_2$, and across conductor 218 to conductor 212 on first page 202. Further, included within the second printed page is a second connection configured to provide a sensor with an indication of current, as depicted at 908. To continue the example with regard to second page 204, the second connection may be the connection of sensor wire 224 to wire 210, where sensor wire 216 connects to sensors 118.

To conclude this example, within the first printed page, the first pair of contacts are positioned at respective locations such that the first pair of contacts makes contact with the second pair of contacts on the second printed page when the second printed page is turned to meet the first printed page, and where in response to the first and second printed pages making contact, the first circuit expands to include the second circuit, as depicted at 910. As described above with regard to FIG. 2, the positioning of conductors 208 and 212 on first page 202 are located within first page 202 such that they correspond to mirrored positions of conductors 220 and 218 on second page 204, and when these pairs of conductors on first page 202 and second page 204 meet in response to a page turn, the portion of the circuit on first page 202 expands to include the portion of the circuit on second page 204. In this way, hybrid print system 104 may determine a currently opened printed page within hybrid print medium 102.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A physical book comprising:
one or more paper pages including printed content;
one or more computer processors;
a power source;
one or more sensors;
a communication interface; and
one or more storage devices storing computer instructions that, when executed by at least one of the one or more computer processors, perform operations including:
supplying, using the power source, power to a circuit having contacts on the one or more paper pages;
detecting electrical current from a contact of the contacts, the contact associated with a paper page of the paper pages;
determining that the paper page is a last paper page to which the physical book was opened;
determining, based in part on a first signal input received by the one or more sensors at a first time, that a first paper page of the one or more paper pages has been turned;
determining, based in part on a second signal input received by the one or more sensors at a second time subsequent to the first time, that a second paper page that consecutively follows the first paper page has been turned;
determining an elapsed time between the first time and the second time;
determining an average reading time per page based in part on an average of the elapsed time and previously measured elapsed times between paper page turns;
determining that the physical book is closed based at least in part on a determination that the circuit having the contacts on the one or more paper pages includes the electric current from a final contact associated with a final paper page of the physical book without a delay greater than the average reading time per paper page; and
transmitting, via the communication interface, a message identifying the last paper page to a synchronization service for synchronizing with an electronic version of the printed content.

2. The physical book of claim 1, wherein the contact of the contacts is a first contact, the paper page is the first paper page, and the first contact is positioned in a mirrored location to a second contact on the second paper page such that the first contact and the second contact make contact in response to being turned in to each other.

3. The physical book of claim 1, wherein each of the one or more paper pages of the physical book includes a circuit connection to the one or more sensors.

4. The physical book of claim 1, wherein the determining that the physical book has been closed is further based in part on all of the one or more paper pages making contact with each other, and the last paper page is determined based at least in part on the physical book being closed.

5. The physical book of claim 2, wherein the first contact is connected to a first sensor and the second contact is connected to a second sensor, and wherein determining that the second paper page has been turned is further based at least in part on a detection of electrical current at the second sensor.

6. A method comprising:
providing power to a circuit with at least a first component of the circuit residing on a first printed page of a physical version of content, the first printed page including first wire segments that form a first circuit connection to a first sensor based at least in part on detecting a current, via a conductive bookmark, across the first wire segments;
determining that the circuit includes at least a second component residing on a second printed page of the physical version of the content, the second printed page including second wire segments that form a second circuit connection to a second sensor based at least in part on detecting the current, via the conductive bookmark, across the second wire segments;
determining that the conductive bookmark has been placed on the second printed page based at least in part on the conductive bookmark carrying a current across the second wire segments to the second sensor; and
transmitting a message including information associated with the second printed page to a computing device.

7. The method of claim 6, wherein the first printed page and the second printed page are among multiple pages bound in a book, the method further comprises determining that the book has been opened, and the power is provided at least partly in response to determining that the book has been opened.

8. The method of claim 7, further comprising determining that the book has been closed, and wherein the transmitting the message is at least partly in response to determining that the book has been closed.

9. The method of claim 8, wherein the determining that the book has been closed includes determining that the circuit is complete on a printed page of the book that the conductive bookmark has been placed.

10. The method of claim 9, further comprising:
determining an average reading speed based at least in part on a page location of the conductive bookmark; and
publishing the average reading speed and the page location of the conductive bookmark to a social network account.

11. The method of claim 10, further comprising:
receiving a synchronization message from a synchronization service, the synchronization message indicating a last position of the content displayed in an electronic version of the content; and
presenting, within a display of the book, a printed page number of the book corresponding to the last position of the content displayed in the electronic version of the content.

12. The method of claim 10, further comprising:
receiving a synchronization message from a synchronization service, the synchronization message indicating a last position of the content displayed in an electronic version of the content; and
wherein the conductive bookmark is an electronic bookmark including a display, and transmitting, to the electronic bookmark, a printed page number of the book corresponding to the last position of the content displayed in the electronic version of the content.

13. The method of claim 6, wherein the first printed page and the second printed page are among multiple pages bound in a book, and wherein the method further comprises:

determining an electronic device associated with a reader of the book; and transmitting the message containing information based on the second printed page to the electronic device.

14. The method of claim 6, wherein the first printed page and the second printed page are among multiple pages bound in a book, and wherein the method further comprises:

determining an electronic device associated with a reader of the book; and requesting a reading location from the electronic device, wherein the reading location corresponds to an electronic version of the content.

15. The method of claim 14, further comprising:

determining, based on the reading location, a corresponding page within the book; and displaying, within a display of the book, instructions to turn to the corresponding page to synchronize with the electronic version of the content of the book.

16. A physical book comprising:

a binding of printed pages including:

components of a circuit, wherein an electric current moves through one or more components of the circuit as one or more of the printed pages are turned, wherein the one or more of the printed pages include circuit connections to corresponding resistors, and wherein an individual resistor of the resistors provides an amount of resistance;

a first printed page of the printed pages including a circuit connection to a first sensor; and a second printed page of the printed pages after the first printed page including the circuit connection to a previous, adjacent printed page; and a computer system including a power source configured to provide an amount of voltage, and wherein the computer system is configured to:

detect an amount of current on the circuit connection to the first sensor;

calculate a number of resistors based at least in part on the amount of voltage, the amount of current, and the amount of resistance;

determine an opened printed page based at least in part on the number of resistors; and transmit a message including information based on the opened printed page.

17. The physical book of claim 16, wherein the power source supplies the electric current that runs through the circuit.

18. The physical book of claim 16, wherein the computer system is further configured to determine that the physical book is closed based at least in part on a determination that the circuit on the printed pages includes a final printed page of the physical book.

19. The physical book of claim 16, wherein the power source is powered by at least one of a battery, solar cells, or an external power source.

20. The physical book of claim 16, wherein the computer system is further configured to cause deactivation of the power source based on a determination that the physical book is closed.

* * * * *